United States Patent
Wong et al.

(10) Patent No.: US 7,293,647 B2
(45) Date of Patent: Nov. 13, 2007

(54) CARRY CASE FOR COMPACT MEDIA

(75) Inventors: Patrick Wong, Vancouver (CA); Jeff Crampton, Vancouver (CA); Ken Young, Vancouver (CA)

(73) Assignee: Spyder Navigations L.L.C., Wilmington, DE (US)

( * ) Notice: Subject to any disclaimer, the term of this patent is extended or adjusted under 35 U.S.C. 154(b) by 0 days.

(21) Appl. No.: 11/033,444

(22) Filed: Jan. 11, 2005

(65) Prior Publication Data

US 2005/0150796 A1 Jul. 14, 2005

Related U.S. Application Data

(60) Provisional application No. 60/536,539, filed on Jan. 14, 2004.

(51) Int. Cl.
*B65D 85/57* (2006.01)

(52) U.S. Cl. ............................... 206/307.1; 206/308.1; 206/308.3

(58) Field of Classification Search ................ 206/307, 206/307.1, 308.1, 308.3, 309, 387.1, 387.14, 206/387.15
See application file for complete search history.

(56) References Cited

U.S. PATENT DOCUMENTS

| 4,892,189 | A | * | 1/1990 | Kunimune et al. | 206/308.1 |
| 5,373,944 | A | * | 12/1994 | Ishitsuka | 206/308.3 |
| 5,531,322 | A | * | 7/1996 | Iwaki et al. | 206/308.3 |
| 5,772,028 | A | * | 6/1998 | Marsilio et al. | 206/387.1 |
| 5,899,327 | A | * | 5/1999 | Sykes | 206/307.1 |
| 5,915,548 | A | * | 6/1999 | Sasaki | 206/307.1 |
| 6,347,654 | B1 | * | 2/2002 | Koch | 206/308.1 |
| 2005/0092628 | A1 | * | 5/2005 | Chang | 206/308.1 |

* cited by examiner

*Primary Examiner*—Luan K. Bui
(74) *Attorney, Agent, or Firm*—Foley & Lardner LLP

(57) ABSTRACT

A case for retaining and transporting small electronic media storage devices. The case includes a first portion and a second portion, connected by a hinge or hinge member about which the two portions may be opened and closed. Each portion of the media case forms a recess preferably configured to securely hold a plurality of media storage device of different size and type.

13 Claims, 8 Drawing Sheets

CARRY CASE FOR COMPACT MEDIA

CROSS REFERENCE TO RELATED APPLICATIONS

The present invention claims the priority of provisional patent application No.

This application is related to U.S. patent application Ser. No. 11/033,521, filed on Jan. 11, 2005, abandoned and entitled "Package for Electronic Storage Media," the contents of which are incorporated herein by reference.

FIELD OF THE INVENTION

The present invention is directed generally to the field of media packaging, and more specifically to an efficient and convenient storage and carry case for compact electronic media devices.

BACKGROUND OF THE INVENTION

Portable electronic devices have become very popular and are used for a variety of different applications. The widespread proliferation of such devices is due readily to rapid technological advances that have made portable electronic devices reliable and convenient to carry form place to place, but also the wide variety of applications that are available for using with them.

One example of a portable electronic device is a cell phone. A cell phone is basically a radio transceiver, which can communicate by one or more radio channels with a nearby base station antenna. Base stations of a cellular network, and there may be a large number of them, are often spread over a large geographic area. The base stations are themselves interconnected creating a large hierarchical communication network. The wireless connection simply gives the cell phone user contact with the telephone network to the same purpose as the wired phone connections in wireline phone systems.

Another type of portable electronic device is a personal digital assistant (PDA). PDAs are often electronic organizers, capable of handling functions such as calendaring, address book, and the creating and storage of various lists. Some PDAs also have communication capability, including wireless communication capability, so that they may send and receive data for the purpose of sharing the data, or simply backing it up.

Although both cell phones and PDAs have become popular for their principle applications, many also use the electronic controller resident in them in order to allow the users to play various games. These games are often written specifically for the type of device in which they are installed, and can range in complexity from simple to fairly elaborate. In some cases, a cell phone, PDA, or similar device that could be used to play games may also use the device's wireless communication capability to network with other players or with a central game server. In this environment, users may interact with each other during the course of the game.

Inevitably, portable electronic devices have evolved that are dedicated primarily, or even totally to use as game playing devices. A typical electronic gaming device (not shown) includes some form of user interface such as a keyboard or microphone or both, so that the user can enter commands and other instructions. The gaming device will also include a visual display, generally a liquid crystal display (LCD), and usually of a greater size than found in typical cell phones or PDAs. Internal components in a gaming device will include a controller for controlling the various interfaces and as well as performing the actual calculations involved in game play and other applications. An internal storage device is also present in order to save these instructions until they are needed. As mentioned above, in electronic gaming devices radio communications may be enabled in order that the game players may not only interact with each other, but also with a source of game applications that can be downloaded to the device.

While some specialized devices are still becoming popular, however, many portable electronic devices no longer function solely (or even primarily) as only a cell phone or only a PDA or only a gaming device. In fact, as rapidly improving technology permits more and more applications to be loaded on a single device, many electronic devices can easily perform all three functions. This convergence of utilization permits a user, or network subscriber, to carry a single portable device that can perform a great many functions instead of two or more dedicated devices.

Portable electronic devices that can be used for game play present a great number of advantages. The first, naturally, is mobility. A personal electronic gaming device can typically play from any given location, and assuming that a wireless channel is available, communicate with other players, or with a gaming network. Moreover, the portable electronic gaming device permits a player to continue game play while they are moving from one location to another, and possibly even while they are in active communication with other players. The portable electronic gaming device also permits the user to access a wide variety of different games, especially in cases where applications may be added, deleted, and even downloaded from a source while the user is in transit.

In addition to using whatever games are installed on an electronic gaming device, or downloaded through a communication network, users can take advantage of games stored on removable data storage media. Removable storage media, which include such devices as CDs, DVDs, and floppy disks, contain all of the instructions necessary for the gaming devices controller to execute a particular application. Frequently, the removable storage media is inserted into a suitable drive in the electronic gaming device, and remains there while the game is being played. In this way all of the instructions loaded onto the media need not be transferred into the internal storage media present in the gaming device. In addition to saving internal storage space, this helps to prevent theft. Game applications that can only be played when the removable storage media is installed prevent users from widely distributing unauthorized copies of the application while retaining a copy on their own gaming device. For users, however, this does not mean that electronic games cannot be shared. When a first user has finished executing (playing) a particular application, they may simply remove the storage device and give it to somebody else, who can insert it into their own electronic gaming device and begin play. Of course, users may carry with them a number of different game-bearing removable media so that wherever they go they have a selection of games to choose from.

Many such removable media devices today are quite small, or compact, and use digital storage techniques so that they have no moving parts. Because of their small size they are easily transportable, and it is convenient to carry a large number of them. Unfortunately, their compactness also means that they are more easily lost, and may, when placed in a purse or briefcase, slip into a location where they might be easily lost or damaged.

FIG. 1 is an isometric view illustrating a typical compact removable storage-media device 100. In this example, media 100 has a top 105, bottom 130, and sides 110, 115, 120, and 125. Note that these designations are arbitrary, and are made for convenience in illustration only. Together, the top, bottom, and sides form a housing for the internal solid-state components (not shown) that are capable of storing data. A plurality of electrical contacts 150 connected to the internal circuitry is positioned on the bottom 130 of media 100, in this embodiment proximate to side 110. As should be apparent, when inserted into an electronic device, side 110 is the leading edge and when the device is properly inserted, the contacts 150 of media device 100 form an electrical connection with corresponding contacts inside the electronic device (not shown), enabling electronic-signal communication between the electronic device and the media 100. In this illustration, a clipped corner 135 is present to make the device asymmetrical and more easily oriented properly for insertion into the gaming (or other) device. Note that media 100 is only one exemplary type of storage device that may be used with various embodiments of the present invention.

As mentioned above, although modern technology provides the ability to fabricate relatively sturdy removable storage-media devices such as media 100, they are still subject to damage, or to being misplaced because of their compact size. In addition, if contacts 150 become dirty, broken, or disconnected, the device may not work even if it is otherwise undamaged. In addition, if the contacts 150 are subjected to contact with other electrical devices or to static discharge, a spurious electrical signal may corrupt the data stored on media device 100. Needed therefore is an efficient and convenient storage case, or package for carrying one or more media such as media 100. The present invention provides just such a solution.

SUMMARY OF THE INVENTION

The present invention is directed to a media case. In a preferred embodiment, the media case of the present invention is able to receive, retain, and securely hold for safekeeping or transport a number of different media devices, which may vary in size and shape.

In one aspect, the present invention is a media case having a first portion forming a media recess and a second portion forming a a media recess. The two portions may be separable, but are in a preferred embodiment connected by a hinge or hinge member. The hinge or hinge member allows the media case to be manipulated between an open configuration and a closed configuration.

In one or both media recesses, a plurality of retaining tabs are formed. The retaining tabs are positioned to retain, for example, a number of multimedia cards or a memory stick. In a preferred embodiment, some of the retaining tabs extend inward from the sidewall farther than others, so that larger media device may be retained over the extreme end of the shorter tabs.

The media case may also include a plurality of clasp tabs for securing it in the closed configuration. Extensions from each sidewall accessible to the user when the case is in the closed configuration may be formed as aids for opening the case. The media case is preferably made from a semi-rigid material, sturdy enough to protect the enclosed media, but flexible enough to permit operation of the tabs. In a preferred embodiment, the first and second portions are integrally formed with hinge member, and allowed to rotate about their respective hinge created by a portion of reduced cross section.

DETAILED DESCRIPTION

Figure 1:
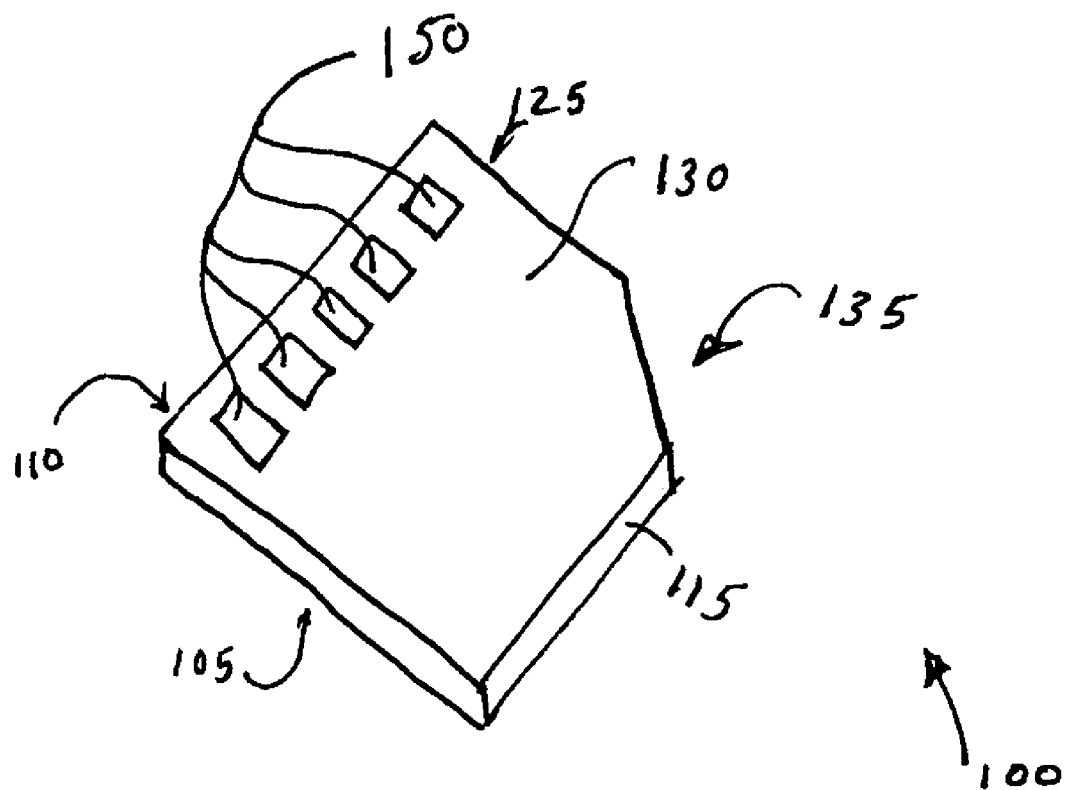
FIG. 1 is a typical MMC (multi-media card), exemplary of one that may be used in association with an embodiment of the present invention.
Figure 2:
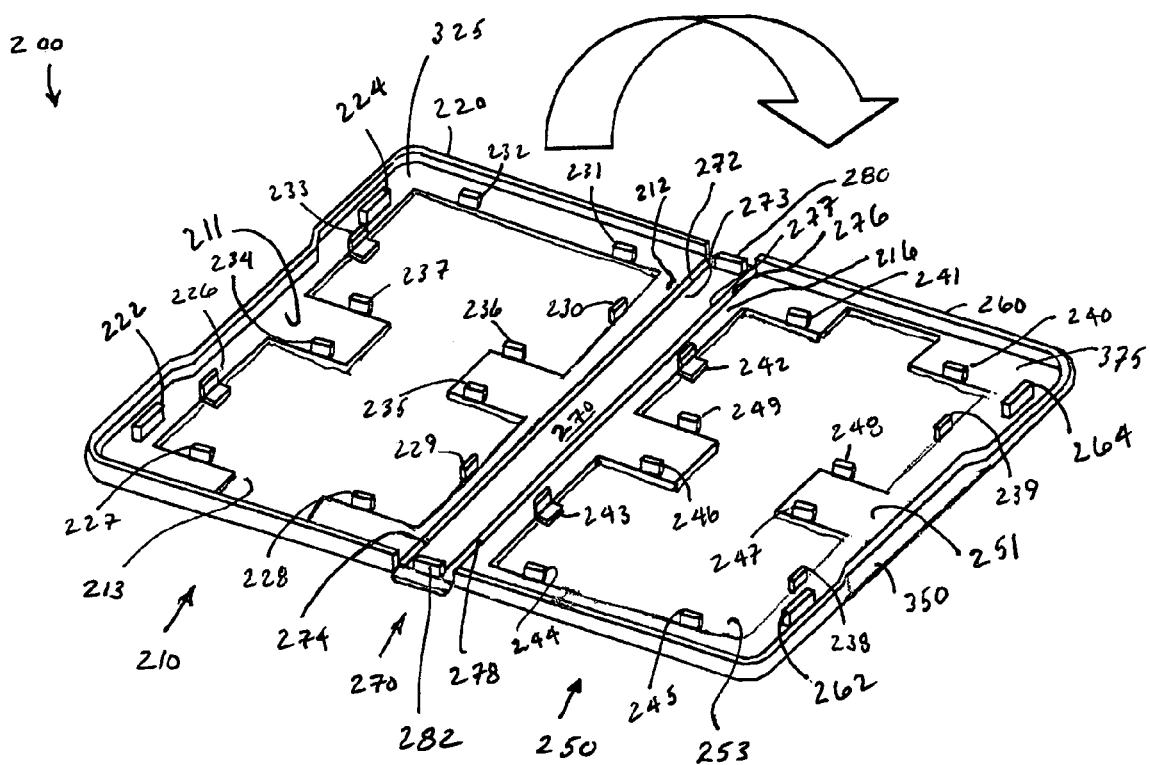
FIG. 2 is an isometric illustration of a media case in an open configuration, constructed according to an embodiment of the present invention.

The present invention is directed to a case, or package, for storing and transporting electronic storage media. FIG. 2 is an isometric illustration of a media case 200 according to an embodiment of the present invention. In FIG. 2, media case 200 is shown in its fully-open configuration, and an arrow positioned above media case 200 in the illustration indicates its direction of closing. In the embodiment of FIG. 2, media case 200 includes a first portion 210, a second portion 250, and a hinge member 270 positioned therebetween. Preferably, each of these components of media case 200 is integrally-formed with the others as a single unit. In an alternate embodiment (not shown), individually-formed components may be cemented or otherwise attached to each other to achieve a similar construction. In one embodiment, media case 200 is formed of a semi-rigid thermoplastic material, such as polypropylene.

In the embodiment of FIG. 2, media case 200 forms a first hinge recess 272 between a first edge 273 of hinge member 270 and inside edge 212 of first portion 210. The first hinge recess 272 creates an elongated first hinge region 274 of reduced thickness, disposed between and connecting first portion 210 with hinge member 270. First hinge region 274 is of sufficiently-reduced thickness so as to permit the material to bend, allowing first portion 210 and hinge member 270 to move rotationally with respect to each other about an axis defined by a first reduced portion 274.

Similarly, media case 200 forms a second hinge recess 276 between a second edge 277 of hinge member 270 and inside edge 216 of second portion 250, creating an elongated second hinge region 278, disposed between and connecting second portion 250 with hinge member 270. Second hinge region 278 is also sufficiently narrow to permit the material to bend, allowing second portion 250 and hinge member 270 to move rotationally with respect to each other about an access defined by a second reduced portion 278.

Figure 3:
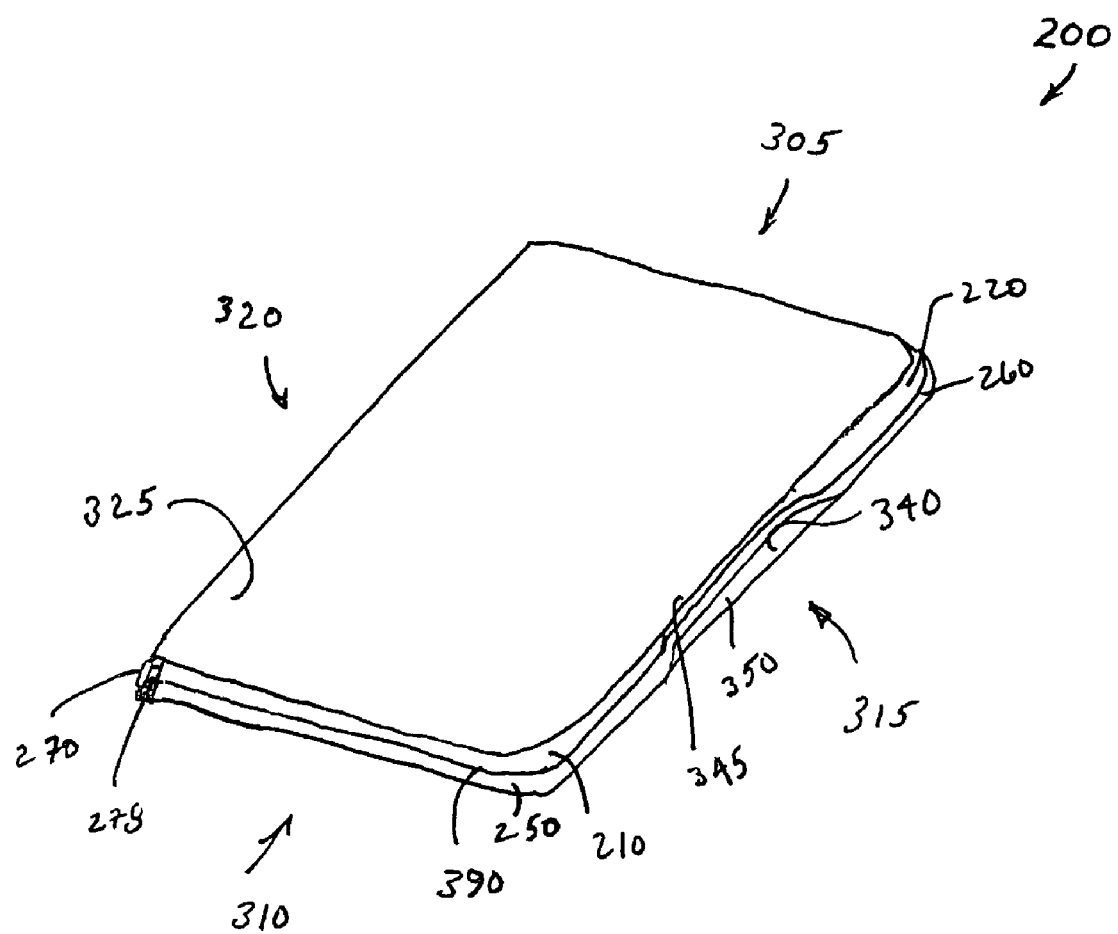
FIG. 3 is an isometric illustration of the media case of FIG. 2, shown in a closed configuration.

When media case 200 is manipulated from the open configuration (shown in FIG. 2) to the closed configuration (shown in FIG. 3), the first portion 210 and the second portion 250 each rotate (approximately 90°, in this embodiment) with respect to hinge member 270 about the respective axes of rotation defined by first hinge region 274 and second hinge region 278, until the media case has latched into the closed configuration, shown in FIG. 3. In the embodiment of FIG. 2, for this purpose clasp tabs 222 and 224 engage corresponding clasp tabs 262 and 264, respectively, to secure the case in its closed configuration.

FIG. 3 is an isometric illustration of the media case 200 of FIG. 2, shown in a closed configuration. In FIG. 3, top side 305 and bottom side 310 are so-called for convenience. Hinge side 320, generally speaking, is formed of hinge member 270. Opposite hinge side 320 is designated clasp side 315. The side wall 325 of first portion 210 is visible in FIG. 3, and opposite side wall 330 of second portion 250. In the closed configuration, first peripheral rim 220 of first portion 210 meets second peripheral rim 260 of second portion 250 at seam 390. Seam 390 extends substantially all of the way around the periphery of closed media case 200, except of course along the hinge side 320.

In the embodiment of FIG. 3, a recess 340 is formed by an inward deviation of first peripheral rim 220 and second peripheral rim 260 in the middle portion of clasp side 315 of media case 200. Disposed on either side of recess 340 are, respectively, a first sidewall extension 345 and a second sidewall extension 350. As should be apparent, the sidewall extensions can be used as an aid to opening media case 200 when it is held in the closed configuration by clasping tabs 222, 224, 262, and 264. Note that the location and configuration of recess 340 is exemplary, and one or more recesses could be formed at alternate locations as well. In addition, while respective inward deviations of first peripheral rim 220 and second peripheral rim 260 are identically formed in the embodiment of FIG. 3, they could be differently formed as well. In an alternate embodiment (not shown), mismatched but adjacent deviations of first peripheral rim 220 and second peripheral rim 260 could be used to expose edges along seam 390 that could be used as an opening aid instead of first sidewall extension 345 and second sidewall extension 350. In yet another alternate embodiment (not shown) sidewall extensions are not created by peripheral-rim deviation, but instead by extending the sidewall beyond the undeviated rims. In either case, the design will be dictated by aesthetic as well as practical concerns.

Returning now to FIG. 2, it can bee seen that peripheral rim 220 is formed along the periphery of first portion 210, and peripheral rim 260 is formed along the periphery of second portion 250. In this embodiment, each peripheral rim extends generally perpendicularly from the sidewall in an inward direction, creating recesses for media storage. Different angles or non-continuous rims may also be used in order to provide a different 'look' or appearance. Peripheral rim 210 forms a first media recess 211 in first portion 210, and peripheral rim 260 forms a second media recess 251 in second portion 250. In use, the various media stored in media case 200 will be received into these recesses and preferably secured into place. Sub-recess 213 is, in this embodiment, a shallow recess formed in sidewall 325, the extent of which is determined somewhat by the first portion media retaining tabs. Sub-recess 253 is similarly formed in second sidewall 375 of second portion 250.

End tab 280 and end tab 282 are formed near respective ends of hinge member 270 and extend inwardly toward the interior of the closed media case 200. Like peripheral rim 220 and peripheral rim 260, hinge end tabs 280 and 282 are preferably integrally formed with the media case 200, and are disposed to lie just inside the peripheral rims when media case 200 is in the closed configuration (see FIGS. 3 and 4). In this manner, end tabs 280 and 282 substantially close off any gap formed in the closed configuration between the peripheral rims and the hinge member. While this may not make the case watertight, it nevertheless helps to prevent the intrusion of large particulate matter, pencil points, and other deleterious objects into the interior of the closed media case.

Each portion of media case 200 includes plurality of retaining tabs extending from the side wall into their respective media recesses. In the embodiment of FIG. 2, first portion 210 includes outer retaining tabs 226-233 and inner retaining tabs 234-237, each arranged in a pattern so that the media case 200 may accommodate several different kinds (that is, sizes) of media devices. Note that the terms "inner" and "outer" refer generally to the location of certain tabs relative to the peripheral rim of the portion in which they are disposed. Inner retaining tabs may also vary somewhat in form or function (as in this embodiment), although it is not necessary that they do so. Note also that the precise location of each retaining tab is unimportant as long as it can perform its intended function. In the embodiment of FIG. 2, outer tabs 226-233 are longer than inner tabs 234-237, so that when necessary, media retained only by some or all of the outer tabs 226-233 may be retained over the extreme end of inner tabs 234-237. Outer tabs 238-245 and inner tabs 246-249 are, in the exemplary embodiment of FIG. 2, likewise formed in second portion 250.

Figure 4:
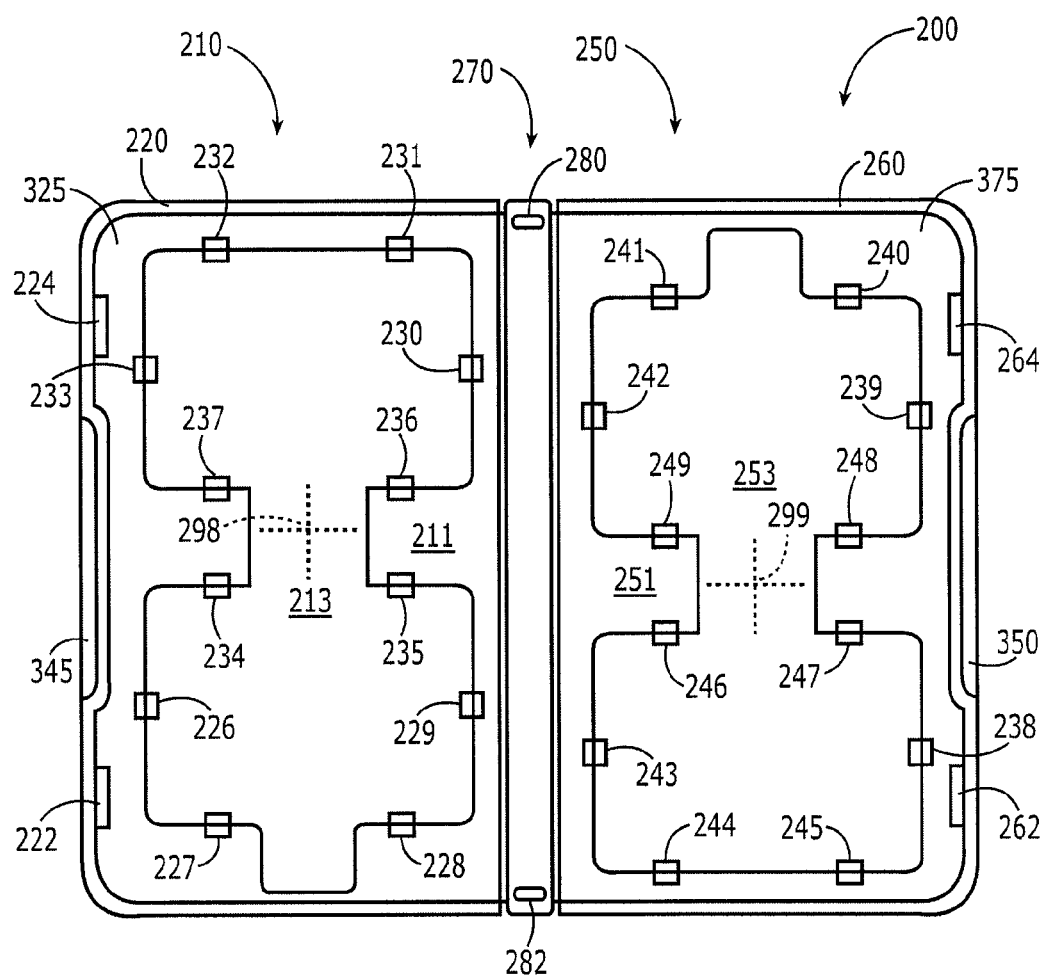
FIG. 4 is a plan view of the media case of FIG. 2, shown in an open configuration.

This exemplary retaining-tab pattern is illustrated more clearly in FIG. 4. FIG. 4 is a simplified plan view of the media case of FIG. 2, shown in an open configuration. As in FIG. 2, hinge member 270 is disposed between first portion 210 and second portion 250, being connected to each by first hinge region 274 and second hinge region 278, respectively. As should be apparent, in this embodiment, the first set of retaining tabs 226-237 in first portion 210 form a symmetrical pattern about center point 298 (which here does not correspond with any separate physical structure). In second portion 250, the second set of retaining tabs 238-249 forms a substantially identical symmetric pattern around center point 299. Note that the location of center point 298 is offset longitudinally from the location of center point 299 so that the retaining tabs do not come into contact with each other when the case 200 is in a closed configuration. Of course, the retaining tabs could be individually offset to the same purpose, so long as they were still capable of retaining the intended media.

Figure 5A:
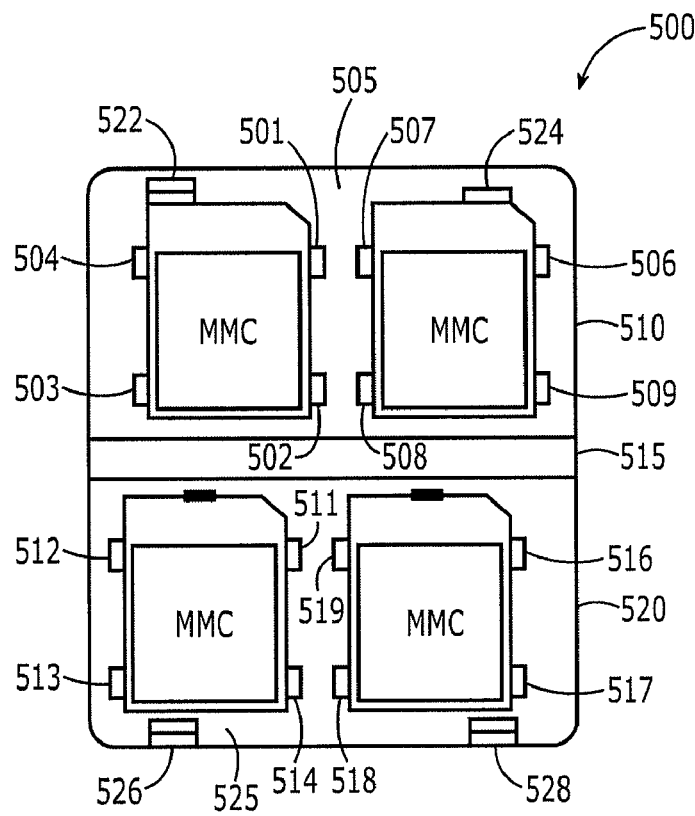
FIGS. 5 (*a*), (*b*), and (*c*) illustrate in a simplified plan view exemplary uses of the media case according to an embodiment of the present invention.
Figure 5B:
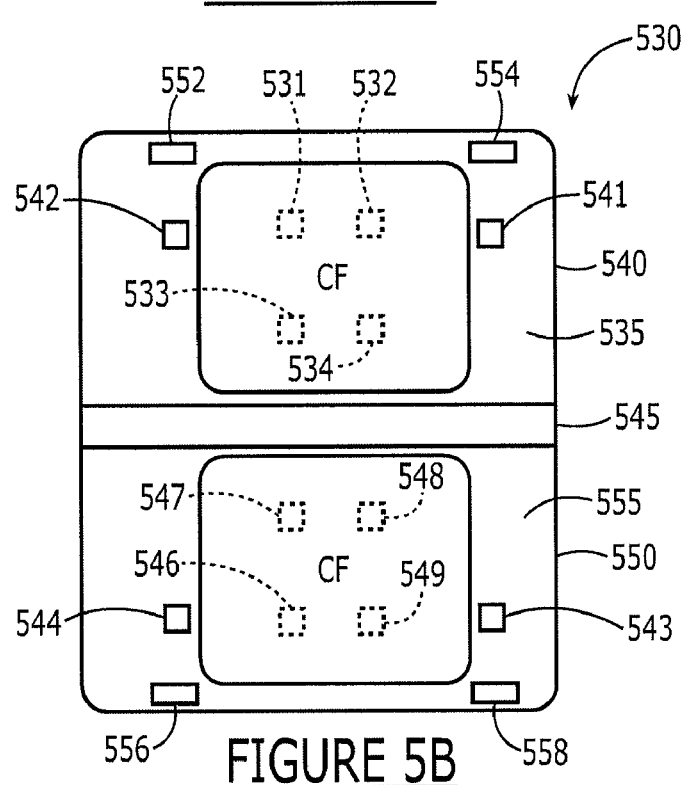
Figure 5C:
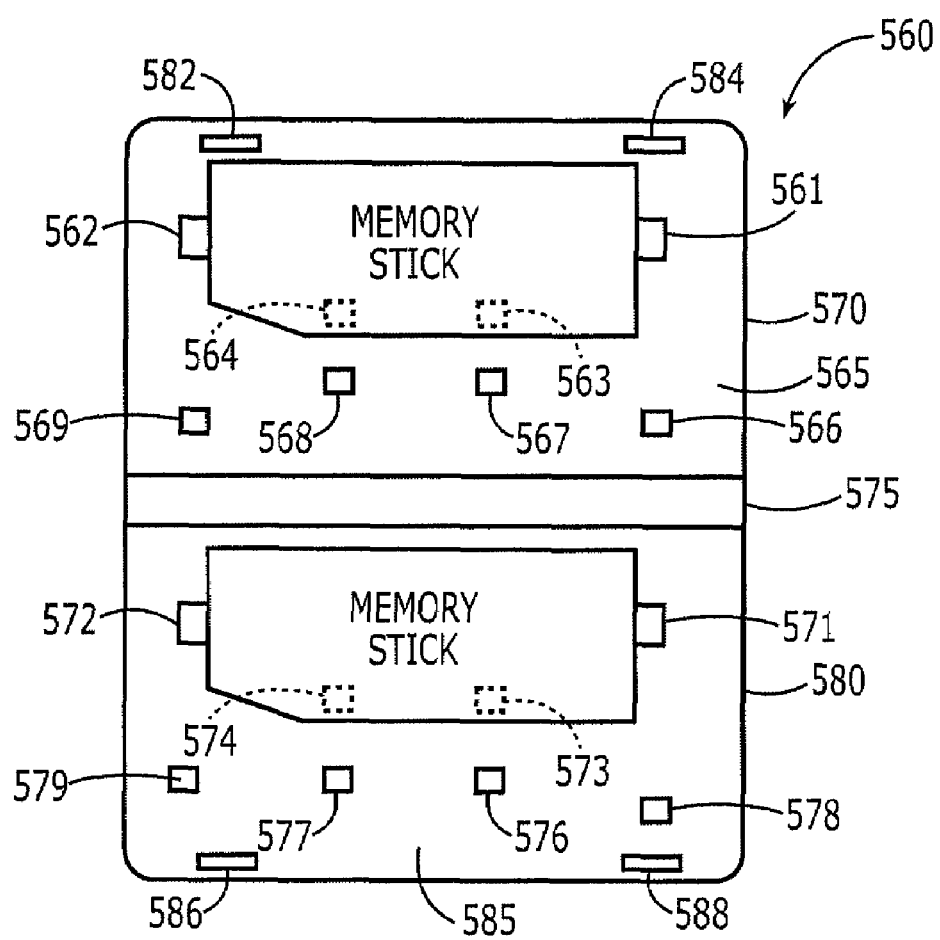

FIG. 5 (a)-(c) are simplified illustrations of three media cases, 500, 530, and 560, respectively, in use according to their respective embodiments of the present invention. Note that these embodiments, and those of the other Figures, are exemplary and their various features, while often analogous, are not intended to be identical. The Figures are not as detailed as the illustrations of FIGS. 2-4, but are intended to convey the usefulness of the present invention. In FIG. 5(a), media case 500, shown in plan view, includes a first portion 510, a second portion 520, and a hinge member 515. Similar to the embodiment of FIGS. 2 and 4, media case 500 includes clasp tabs 522 and 524 formed in media recess 505 of first portion 510. When the case 500 is manipulated into its closed configuration, clasp tabs 522 and 524 will engage clasp tabs 526 and 528 formed in media recess 525 of second portion 520 in order to secure media case 500 in a closed position.

In the illustration of FIG. 5(*a*), positioned in media recess 505 of case 500 are two MMCs (multimedia cards), which are held in place by retaining tabs 501-504 and 506-509, respectively. Similarly, retaining tabs 511-514 and 516-519 retain two MMCs in recess 525 of second portion 520. No sub-recesses are shown (see FIG. 2), but could certainly be present in this embodiment if desired. Other features may In any event, it should be apparent that the four MMCs are being contained in a manner that is relatively secure and convenient to the user.

Similarly, the case 530 FIG. 5(*b*) includes a first portion 540 forming media recess 535, second portion 550 forming media recess 555, and hinge member 545. Clasp tabs 552 and 554 are for engaging clasp tabs 556 and 558 when the case 530 is in the closed configuration. Here, however, a compact flash (CF) memory device is being retained by retaining tabs 541 and 542 in media recess 535. As with the embodiment of FIG. 2, in this embodiment the retaining tabs 531-534 (shown by broken line) are formed sufficiently shorter than retaining tabs 541 and 542 such that the retention of the compact flash by the latter is possible. In this embodiment, the second portion 550 also contains a compact flash, held in place by retaining tabs 543 and 544 over retaining tabs 546-549.

As should be apparent, the compact flash in either portion of media case 530 could be removed and replaced by one or two of the (smaller-sized) MMC cards shown in FIG. 5(*a*). One such card might, for example, be retaining by retaining tabs 531, 533, and 542. A second, if present, might be retained by retaining tabs 532, 534, and 541. Of course, the compact flash shin in the second portion 550 could be replaced in like fashion.

In FIG. 5(*c*), media case 560 includes a first portion 570, a second portion 580, and a connecting hinge member 575. Received in first-portion media recess 565 is a memory stick, another form of memory device. The memory stick is held in place by retaining tabs 561 and 562 over unused retaining tabs 563 and 564. In this use, inner retaining tabs 567 and 568 are also unused, as are outer tabs 566 and 569. As with the media cases 500 and 530, if the memory stick is removed from media recess 565, it may be replaced with another type of memory device. Similarly, a memory stick received in second-portion media recess 585 is retained by retaining tabs 571 and 572 over tabs 573 and 574, while retaining tabs 576-579 are in this situation idle. Clasp tabs 582 and 584 engage clasp tabs 586 and 588 to secure the case 500 in a closed configuration.

These uses are, again, exemplary, and other uses are possible. Naturally, the first portion and second portion of any given media case may be used to retain different types of devices. Adjustment to tab position, or the forming of more or fewer retaining tabs will permit different types of devices to be held. Finally, note that the forming of retaining tabs of different size or shape, while advantageous in some uses, is not a requirement of the invention unless specifically recited.

Figure 6:
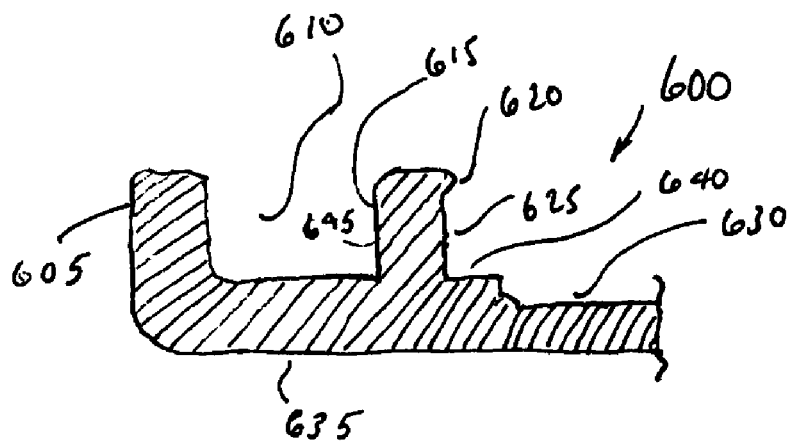
FIG. 6 is a cross-sectional view of the portion of a media case including an exemplary retaining tab according to an embodiment of the present invention.

FIG. 6 is a cross sectional view of a portion 600 of a media case according to an embodiment of the present invention. The embodiment of FIG. 6 is, for convenience, intended to be similar though not necessarily identical to the retaining tab 227 (for example) shown in FIG. 2 (and sectioned longitudinally). Media case portion 600 includes a peripheral rim 605 extending from and substantially perpendicular to side wall 635, which together constitute a portion of the exterior of the media case. These two structures also form a media recess 610 into which MMCs or other memory devices may be received. Assuming the media to be of an appropriate size, it may be retained in part by retaining tab 615, which extends from side wall 635 inwardly in to recess 610.

The length of retaining tab 615 is suited to the type of media it is intended to retain. When received, the media will ordinarily be retained by at least two preferable opposing retaining tabs, the distance between which is also determined by the size of the expected media. Ideally, the media will fit snugly into the recess 625 formed by the base 645 of retaining tab 615 and an inward projection 620. Retaining tab 615 (and usually the entire media case) is fabricated of a material that will permit its extreme end to flex slightly toward peripheral rim 605 when the media device is inserted and removed, and otherwise return to its relaxed position so that the media is retained between inward projection 620 and the interior side 640 of sidewall 635. In this embodiment, sub-recess 630 is formed a short distance from the retaining tab 615. (See also retaining tabs 226 and 233 shown in FIG. 2.) In an alternate embodiment, the sub-recess, if present, may begin immediately at the base of the retaining tab, and in some cases one or more retaining tabs may be positioned in the sub-recess itself (not shown).

Figure 7:
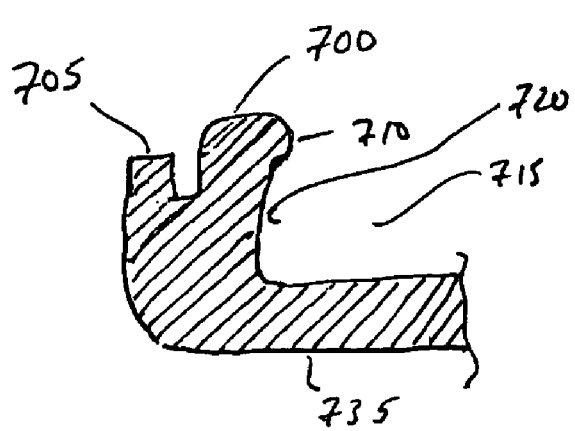
FIG. 7 is a cross-sectional view of the portion of a media case including a clasp tab of a first type according to an embodiment of the present invention.
Figure 8:
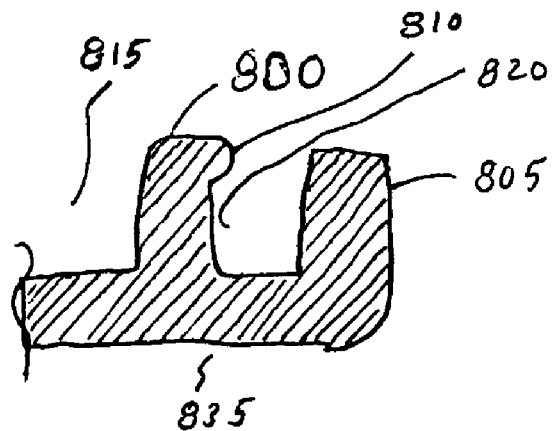
FIG. 8 is a cross-sectional view of the portion of a media case including a clasp tab of a second type according to an embodiment of the present invention.

FIG. 7 is a cross-section of a clasp tab 700, exemplary of one that might be found on a first portion of the media case of the present invention. As can be seen in FIG. 7, clasp tab 700 is located near peripheral rim 705, and forms an inward projection 710 at its extreme end (the end furthest from sidewall 735). Inward projection 710 forms a recess 720 along the inward side (toward the hinge member, which is not shown in FIG. 7). In this embodiment, recess 720 is continuous with media recess 715. FIG. 8 is a cross-section of a clasp tab 800, exemplary of one that might be found on a second portion of the media case of the present invention. Peripheral rim 805 extends perpendicularly from sidewall 835 to form media recess 815. Clasp tab 800 forms an outward projection at the extreme end of clasp tab 800, forming recess 820 on the outward side of tab 800.

FIGS. 7 and 8 are drawn to approximate the orientation of two corresponding clasp tabs, such as tabs 222 and 262 (shown in FIG. 2), when the media case is in the fully open configuration. When closed, the inward projection 710 will contact outward projection 810. If a closing force is applied, one of both of tabs 700 and 800 will flex slightly to permit the two projections to slide with respect to each other until projection 710 reaches recess 820 and projection 810 reaches recess 720, whereupon the flexed tab or tabs will at least partly relax such that the tabs will effectively engage each other and prevent the case from re-opening with out the application of at least some opening force (for example on the inner sides of sidewall extensions 345 and 350 shown in FIG. 3). As should be apparent, however, the clasp tabs do not have to be formed exactly as shown in FIGS. 7 and 8.

Figure 9:
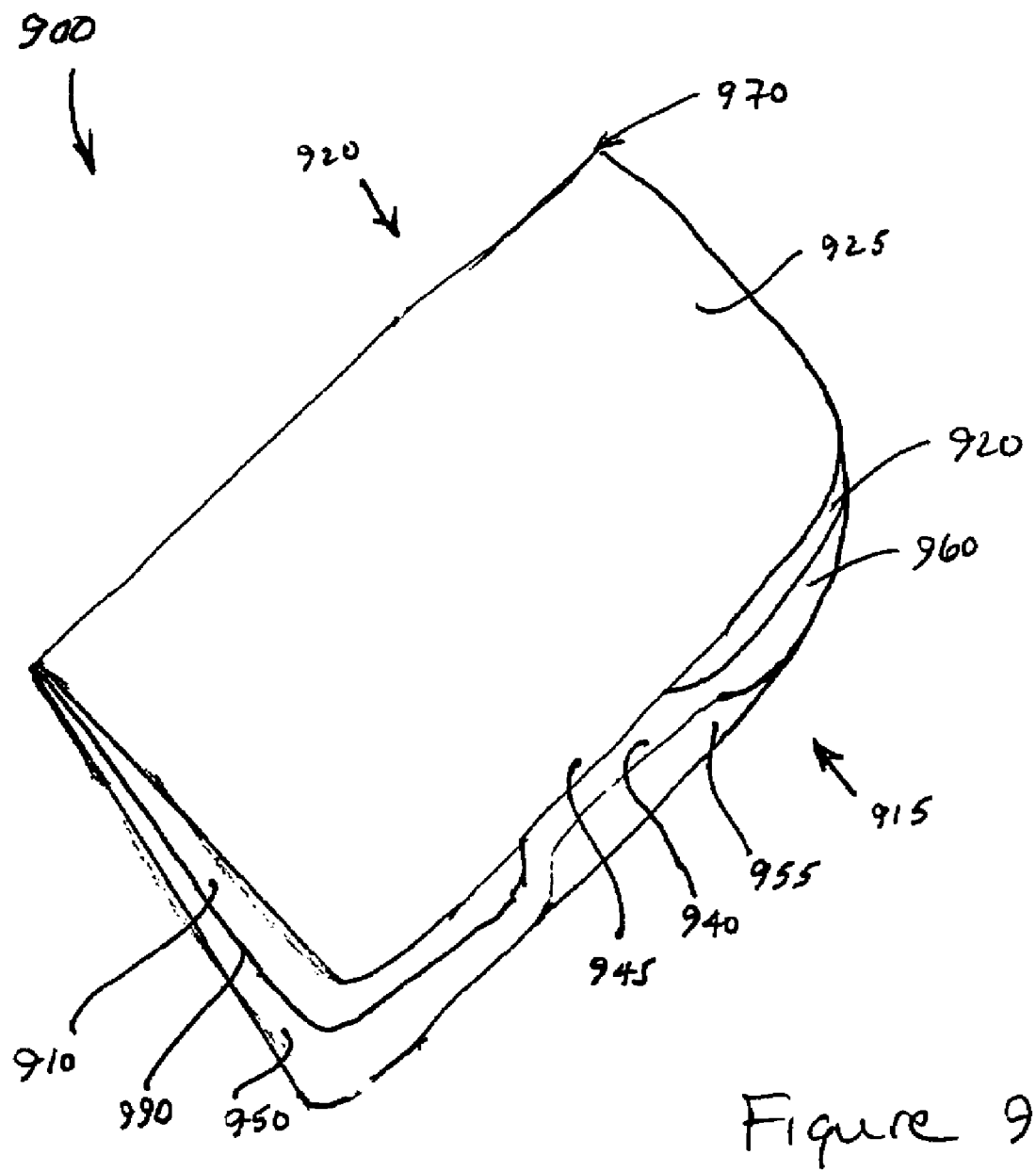
FIG. 9 is an isometric illustration of a media case constructed according to an alternate embodiment of the present invention.

Variations of the media case of the present invention itself are also possible. FIG. 9 is an isometric illustration of media case 900 according to another embodiment of the present invention.

As should be apparent, the media case 900 of FIG. 9 lacks member like hinge member 270 shown in FIG. 2. Instead, first portion 910 is connected to second portion 950 by a single hinge 970 on hinge side 920 of case 900 while not shown in FIG. 9, hinge 970 may be similar in construction to, for example, first hinge region 274 shown in FIG. 2.

Returning to FIG. 9, when employing such a hinge, peripheral rim 920 and peripheral rim 960 are tapered so as to not interfere with each other in the closed configuration (shown in FIG. 9). In the closed configuration, peripheral rims 920 and 960 meet at seam 990. Sidewall 925 forms a sidewall extension 945. Sidewall extension 945 and sidewall extension 955 form the sides of recess 940 created by the inward deviation of peripheral rims 920 and 960 at the clasp side 915 of case 900.

The interior of media case 900 (not shown) may be similar to that of media case 200 shown in FIGS. 2-4, except for changes necessitated by the reduced dimension on hingeside 920.

The descriptions above are of preferred examples for implementing the invention; the scope of the invention, however, should not necessarily be limited by this description. Rather, the scope of the present invention is defined by the following claims.

What is claimed is:

1. A case for electronic storage media, comprising:
    a first portion comprising a first sidewall, the first sidewall comprising a first plurality of retaining tabs for retaining electronic storage media; and
    a second portion rotatably connected to the first portion, such that the first and second portions may be moved into a closed configuration, the second portion comprising a second sidewall that is positioned opposite the first sidewall when the first and second portions are moved into the closed configuration;
    wherein the first plurality of retaining tabs comprises a first set of tabs for retaining a first electronic storage media and a second set of tabs for retaining a second different electronic storage media, the second different electronic storage media having a smaller size than the first electronic storage media;
    wherein the first and second sets of tabs extend from the first sidewall inward generally toward the oppositely-positioned second sidewall when the first and second portions are in the closed configuration;
    wherein the first set of tabs extends inward from the first sidewall a greater distance than the second set of tabs;
    wherein each of the first set of tabs is disposed nearer to a periphery of the first portion than the second set of tabs so that the larger first electronic storage media can be retained over extreme ends of the second set of tabs;
    wherein the second portion comprises a second plurality of retaining tabs for retaining electronic storage media;
    wherein the second plurality of retaining tabs comprises a third set of tabs configured for retaining the first electronic storage media and a fourth set of tabs configured for retaining the second different electronic storage media; and
    wherein the first plurality of retaining tabs are arranged about a first center point, and the second plurality of retaining tabs are arranged about a second center point, and wherein the first center point and the second center point are offset with respect to each other when the case is in the closed configuration.

2. The case of claim 1, further comprising a hinge member disposed between the first portion and the second portion.

3. The case of claim 2, wherein the hinge member is integrally formed with the first portion.

4. The case of claim 3, wherein the hinge member is integrally formed with the second portion.

5. The case of claim 4, wherein the case forms a first elongated recess at the junction of the hinge member and the first portion and a second elongated recess at the junction of the hinge member and the second portion.

6. The case of claim 2, further comprising at least one end tab extending from the hinge member.

7. The case of claim 6, wherein the retaining tabs and the at least one end tab extend inwardly when the case is in the closed configuration.

8. The case of claim 2, wherein the retaining tabs are integrally formed with the first portion and the at least one end tab is integrally formed with the hinge member.

9. The case of claim 2, further comprising an inwardly-extending peripheral rim that forms at least a portion of a side wall of the case when it is in the closed configuration.

10. The case of claim 2, further comprising a first peripheral rim extending inwardly from the first portion and a second peripheral rim extending inwardly from the second portion, wherein the first and second peripheral rims form at least a portion of a side wall of the case when it is in the closed configuration.

11. The case of claim 10, wherein the hinge member forms at least a portion of the side wall of the case when it is in the closed configuration.

12. The case of claim 10, wherein the first portion comprises an exterior wall, and wherein the first peripheral rim forms an inwardly-extending recess on the portion of the side wall opposite the hinge member such that a portion of the first-portion exterior wall forms a side wall of the inwardly-extending recess.

13. The case of claim 1, wherein the first plurality of retaining tabs are arranged symmetrically about the first center point, and the second plurality of retaining tabs are arranged symmetrically about the second center point.

* * * * *

UNITED STATES PATENT AND TRADEMARK OFFICE
CERTIFICATE OF CORRECTION

| | | |
|---|---|---|
| PATENT NO. | : 7,293,647 B2 | Page 1 of 1 |
| APPLICATION NO. | : 11/033444 | |
| DATED | : November 13, 2007 | |
| INVENTOR(S) | : Patrick Wong, Jeff Crampton and Ken Young | |

It is certified that error appears in the above-identified patent and that said Letters Patent is hereby corrected as shown below:

<u>Col. 1, line 7:</u>

Insert "60/536,539 filed on 14 January 2004, the contents of which are incorporated herein by reference" at the end of the sentence to read: --The present invention claims the priority of provisional patent application number 60/536,539 filed on 14 January 2004, the contents of which are incorporated herein by reference.--

<u>Col. 1, line 4:</u>

Delete the word "abandoned" after "Jan. 11, 2005,".

Signed and Sealed this

Twenty-ninth Day of April, 2008

JON W. DUDAS
*Director of the United States Patent and Trademark Office*